United States Patent [19]

Kaneishi et al.

[11] Patent Number: 5,465,908
[45] Date of Patent: Nov. 14, 1995

[54] GAS-FEEDING NOZZLE

[75] Inventors: Akimasa Kaneishi; Akinori Toyota, both of Hiratsuka, Japan

[73] Assignee: Mitsubishi Gas Chemical Company, Inc., Japan

[21] Appl. No.: 200,517

[22] Filed: Feb. 23, 1994

[30] Foreign Application Priority Data

Mar. 5, 1993 [JP] Japan .................................. 5-045116
Oct. 19, 1993 [JP] Japan .................................. 5-261176

[51] Int. Cl.⁶ .................................................. B05B 1/32
[52] U.S. Cl. ........................... 239/571; 239/574; 239/575; 239/590.3; 239/DIG. 19
[58] Field of Search ........................... 239/552, 553, 239/553.3, 553.5, 570, 571, 574, 575, 600, DIG. 19, 590, 590.3, 590.5

[56] References Cited

U.S. PATENT DOCUMENTS

| | | | |
|---|---|---|---|
| 2,040,846 | 5/1936 | Hesselman | 239/574 |
| 3,034,731 | 5/1962 | Chapin | 239/574 X |
| 3,083,953 | 4/1963 | Langdon et al. | 239/571 X |
| 4,740,150 | 4/1988 | Sayer | |
| 4,841,884 | 6/1989 | Engstrom et al. | 239/DIG. 19 X |
| 4,855,094 | 8/1989 | Hendry | |
| 4,943,407 | 7/1990 | Hendry | |
| 5,044,924 | 9/1991 | Loren | |

FOREIGN PATENT DOCUMENTS

| | | |
|---|---|---|
| 0421842A1 | 4/1991 | European Pat. Off. . |
| 0485726A2 | 5/1992 | European Pat. Off. . |
| 0529232A1 | 3/1993 | European Pat. Off. . |
| 4-31015 | 2/1992 | Japan . |

Primary Examiner—William Grant
Attorney, Agent, or Firm—Wenderoth, Lind & Ponack

[57] ABSTRACT

A gas-feeding nozzle 10 for use in a mold 42 attached to an injection molding machine and for introducing a pressurized gas into a molten resin 60 injected into the cavity 48 of the mold, for producing a molded article having a hollow structure, the gas-feeding nozzle 10 comprising a non-return valve 12 provided at an outlet end of the gas-feeding nozzle 10 and a mechanism 14 for preventing the inflow of molten resin, the mechanism is provided upstream to the non-return valve 12 in the flow direction of the pressurized gas.

5 Claims, 5 Drawing Sheets

GAS-FEEDING NOZZLE

BACKGROUND OF THE INVENTION AND RELATED ART

The present invention relates to a gas-feeding nozzle for use with an injection molding machine for producing an injection-molded article which is free of sink marks and distortion and is excellent in appearance. More specifically, it relates to a gas-feeding nozzle for introducing a pressurized gas into a molten resin injected into the cavity of a mold when a molded article having a hollow structure is produced by means of an injection molding machine.

For example, JP-A-64-14012 (corresponding to U.S. Pat. No. 4,740,150) discloses an injection molding machine used for producing a molded article free of sink marks and distortion and excellent in appearance. In the technique disclosed in JP-A-64-14012, a molten thermoplastic resin is injected into the cavity of a mold, then a pressurized gas is introduced into the molten thermoplastic resin in the cavity to form a hollow structure within the thermoplastic resin, and the gas within the hollow structure is released into atmosphere before the mold is opened.

The above JP-A-64-14012 also discloses a valve mechanism for introducing a pressurized gas. This valve mechanism is provided with a bore, and the pressurized gas is introduced through the bore into the molten thermoplastic resin injected into the cavity of the mold. A non-return valve is provided in the outlet end of the bore. The non-return valve prevents the molten thermoplastic resin injected into the cavity from flowing into the bore. Further, after the pressurized gas is introduced into the molten thermoplastic resin injected into the cavity, the non-return valve prevents the pressurized gas from flowing back from the hollow structure formed within the molten thermoplastic resin to the bore while the thermoplastic resin is cooled to solidness in the cavity.

However, when molded articles are produced according to the technique disclosed in the above JP-A-64-14012, the following problem is liable to occur. When the gas within the hollow structure is released into atmosphere, resin fragments are blown off to adhere the periphery of the non-return valve of the valve mechanism, or the resin remaining in the bore adheres to the non-return valve. As a result, the non-return valve can no longer function properly when a molten thermoplastic resin is injected into the cavity, and part of the molten thermoplastic resin flows into the bore through the non-return valve and further flows into a tubing for feeding a pressurized gas (sometimes referred to as "gas tubing" hereinafter).

When the molten thermoplastic resin has flown into the bore or the gas tubing, the bore or the gas tubing may be cleaned by a method in which the molten thermoplastic resin is pressed back to the cavity by means of a pressurized gas. However, it is very difficult to remove the molten thermoplastic resin completely from the bore or the gas tubing, and cooled and solidified resin builds up within the bore or the gas tubing. As a consequence, the resin that has built up as above is liable to clog the bore and the gas tubing, and finally prevents the introduction of a pressurized gas into a molten thermoplastic resin injected into the cavity.

For example, JP-A-1-157823 (corresponding to U.S. Pat. Nos. 4,855,094 and 4,943,407) discloses the use of an orifice having a diameter of 0.13 to 10 mm as a nozzle for feeding a pressurized gas in an injection molding machine for producing molded articles having a hollow structure. However, when molded articles are produced according to the technique disclosed in this JP-A-1-157823, the orifice is sometimes clogged depending upon the kind and viscosity of a resin used and injection molding conditions.

OBJECT AND SUMMARY OF THE INVENTION

It is an object of the present invention to provide a gas-feeding nozzle which permits smooth and reliable introduction of a pressurized gas into a molten resin injected into the cavity of a mold.

According to the present invention, the above object and advantages of the present invention are achieved by a gas-feeding nozzle for use in a mold attached to an injection molding machine and introducing a pressurized gas into a molten resin injected into the cavity of the mold, for producing a molded article having a hollow structure, the gas-feeding nozzle comprising a non-return valve provided at an outlet end of the gas-feeding nozzle and a means of preventing the inflow of molten resin, which means is provided upstream to the non-return valve in the flow direction of the pressurized gas. The means of preventing the inflow of molten resin is preferably provided in a position nearest to the non-return valve possible.

In a preferred embodiment of the present invention, the means of preventing the inflow of molten resin is constituted of a filter having a great number of openings for passing a pressurized gas. When the above filter is provided upstream to the non-return valve in the flow direction of the pressurized gas, the pressurized gas is introduced into a molten resin in the cavity of the mold through the filter and the non-return valve. On the other hand, a very small amount of the molten resin which has flown in from the cavity through the non-return valve cannot flow any further from the filter. Further, the molten resin whose flowing has been stopped by the filter is pressed back into the cavity by a pressurized gas, whereby the buildup of the resin in the gas tubing can be prevented, and as a result, the clogging of the gas tubing, a gas flow path and the non-return valve can be prevented.

Each of the openings of the filter preferably has a cross-sectional area of $8 \times 10^{-7}$ to $8 \times 10^{-3}$ mm$^2$. Having a cross-sectional area in the above range, each of the openings can prevent the flow of the molten resin through the filter and can allow a pressurized gas to pass the filter easily. The filter is therefore not clogged. When the above cross-sectional section of each opening is smaller than $8 \times 10^{-7}$ mm$^2$ the pressure loss in the filter increases and the flowing of a predetermined amount of a pressurized gas may be prevented in introducing the pressurized gas into a molten resin injected into the cavity. When the above cross-sectional section is larger than $8 \times 10^{-3}$ mm$^2$, the molten resin may pass through the filter to flow into the gas flow path or the gas tubing, and the cooled and solidified resin may clog the filter. When the filter is clogged as above, the pressurized gas can no longer be introduced into a molten resin injected into the cavity.

Each of the openings of the filter preferably has the form of a straight tube or a curved tube, and the total of cross-sectional areas of the openings is preferably at least 0.03 mm$^2$. When the total of cross-sectional areas of the openings is smaller than 0.03 mm$^2$ the pressure loss in the filter may increase and the flowing of a predetermined amount of a pressurized gas may be prevented in introducing the pressurized gas into a molten resin injected into the cavity. The upper limit of the total of cross-sectional areas of the openings can be determined on the basis of the cross-sectional area of the gas-feeding nozzle, etc.

The filter may be formed of any material, while it is preferably formed of a sintered body of a stainless steel-based alloy or a sintered body of ceramics.

In a preferred embodiment of the gas-feeding nozzle of the present invention, the means of preventing the inflow of molten resin may be constituted of 1 to 3 non-return valves, preferably of one non-return valve. In this constitution, the molten resin injected into the cavity may pass through the non-return valve provided at an outlet end of the gas-feeding nozzle, but the non-return valve(s) constituting the means of preventing the inflow of molten resin can prevent the molten resin from flowing any further into the gas flow passage or the gas tubing. On the other hand, the pressurized gas presses the molten resin (whose flowing was stopped by the non-return valve constituting the means of preventing the inflow of molten resin) back to the cavity. Therefore, the buildup of the resin in the gas flow path and the gas tubing can be prevented, and the clogging of the gas flow path and the gas tubing can be prevented.

As the means of preventing the inflow of molten resin, it is sufficient to use one non-return valve. In practical sense, 1 to 3 non-return valves may be used, while the means of preventing the inflow of molten resin is preferably constituted of one non-return valve. As the number of the non-return valves constituting the means of preventing the inflow of molten resin increases, the means of preventing the inflow of molten resin increase the pressure loss in introducing the pressurized gas into a molten resin, and the flowing of a predetermined amount of the pressurized gas may be hampered. When one non-return valve is used as the means of preventing the inflow of molten resin, the pressure loss does not increase too much.

Further, for preventing the clogging of the gas-feeding nozzle by a resin and for accomplishing reliable introduction of the pressurized gas, it is effective to heat the gas-feeding nozzle of the present invention by means of a heating means disclosed in JP-A-4-31015.

The method of producing a molded article by means of an injection molding machine with a mold provided with the gas-feeding nozzle of the present invention will be briefly explained below.

First, a molten resin is injected into the cavity of the mold. Then, a pressurized gas is introduced into the molten resin in the cavity of the mold through the gas-feeding nozzle of the present invention, thereby to form a hollow structure within the molten resin in the cavity of the mold. The molten resin in the cavity of the mold is cooled and solidified while maintaining the pressure of the pressurized gas introduced into the hollow structure. When the cooling of the molten resin into solidness is completed, the molded article is taken out of the mold. For preventing the deformation of the molded article under the pressure of the pressurized gas introduced into the hollow structure, the gas-feeding nozzle is moved away from the mold, for example, by a retreat movement, and the pressurized gas introduced into the hollow structure is required to be released into atmosphere before the mold is opened. The gas-feeding nozzle of the present invention can effectively prevent the gas-feeding nozzle from being clogged by resin fragments blow off when the pressurized gas is released from the hollow structure. Other advantages and effects of the present invention will be apparent from the following detailed description of the invention.

BRIEF DESCRIPTION OF THE DRAWINGS

The present invention will be explained in detail hereinafter with reference to drawings.

DESCRIPTION OF THE PREFERRED EMBODIMENTS

Figure 1:
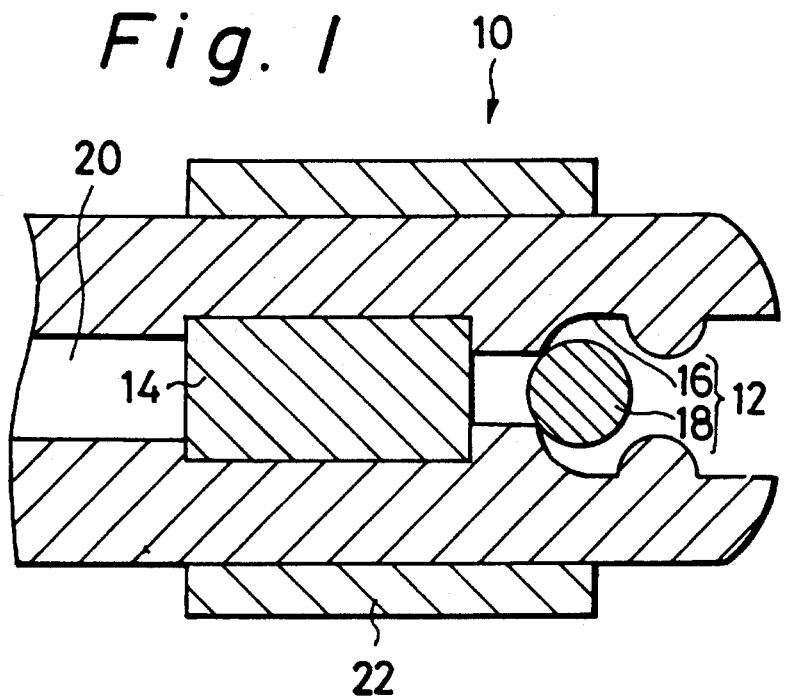
FIG. 1 is a schematic cross-sectional view of part of a gas-feeding nozzle used in Example 1.

In FIG. 1, numeral 10 indicates a gas-feeding nozzle. As schematically shown in FIG. 1, the gas-feeding nozzle 10 is constituted of a non-return valve 12 provided at an outlet end portion (downstream end) of the gas-feeding nozzle and a means of preventing the inflow of molten resin, provided upstream to the non-return valve 12 in the flow direction of a pressurized gas. In this Example, the means of preventing the inflow of molten resin is constituted of a filter 14 having a great number of openings. Each opening of the filter 14 has a cross sectional area of $2 \times 10^{-3} mm^2$, and the total of cross-sectional areas of the openings is arranged to be 0.8 $mm^2$. Each opening of the filter 14 has the form of a straight tube. That is, the filter 14 has 400 straight holes. The filter 14 is formed of a sintered body of a stainless steel-based alloy. The filter 14 can be produced by shaping a powder of a stainless steel-based alloy into a shaped body having openings and sintering the shaped body. The filter 14 may be also produced by making openings in a desired material by means of laser processing, etc.

The non-return valve 12 is formed of a non-return valve casing portion 16, and a ball 18 made of a metal and provided within the non-return valve casing portion 16. A pressurized gas reaches the non-return valve 12 through a gas flow path 20, moves the ball 18 to the right hand side in FIG. 1, and is injected through the non-return valve 12. The ball 18 is energized toward the left hand side in FIG. 1 by a molten resin when a molten resin reaches to the non-return valve 12 during an injection process, and the ball 18 is pressed to the left hand side wall of the non-return valve casing portion 16. As a result, the non-return valve 12 is in a closed state, and the non-return valve 12 can prevent the molten resin, etc., from flowing back.

In FIG. 1, numeral 20 indicates the gas flow path as described above, through which a pressurized gas flows from left hand side to right hand side in FIG. 1. Further, numeral 22 indicates a heater for carrying out the reliable gas introduction, and the heater 22 is provided on that outer surface of the gas-feeding nozzle 10 which is near the outlet end of the gas-feeding nozzle 10.

Figure 2:
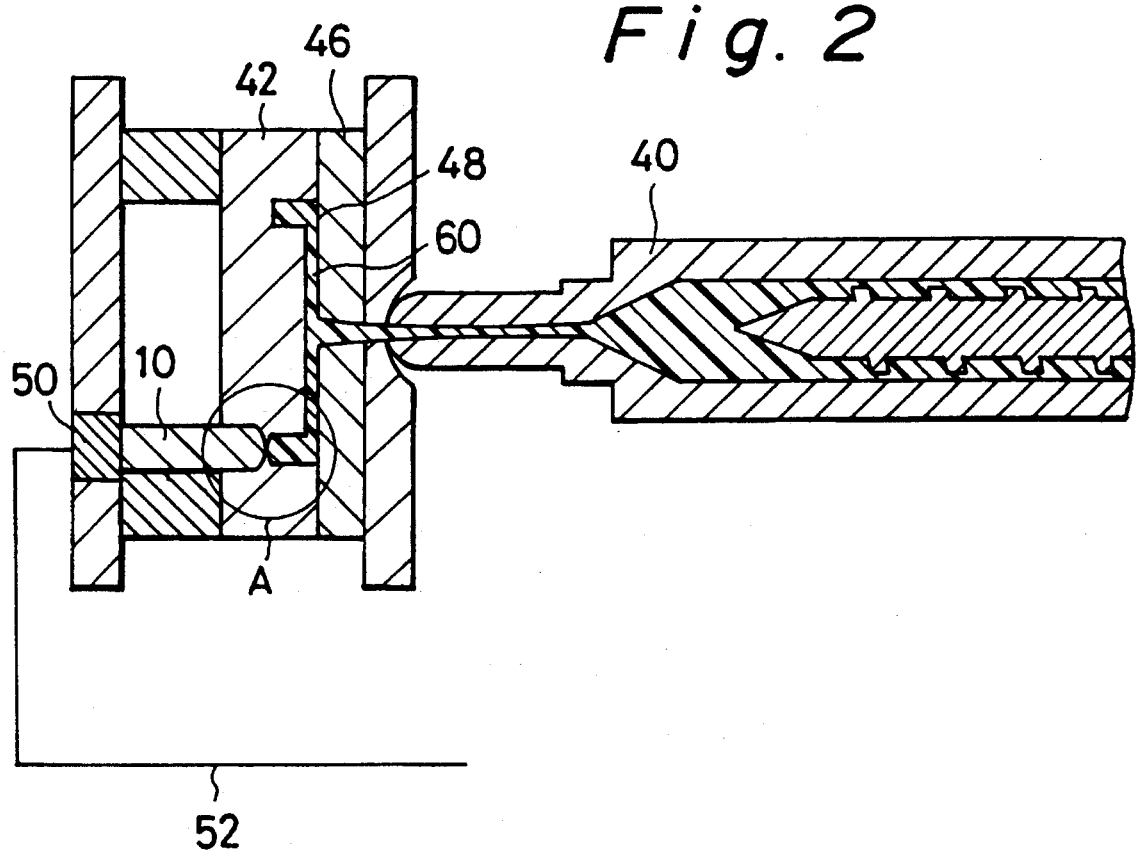
FIG. 2 is a schematic cross-sectional view showing a state in which the gas-feeding nozzle used in Example 1 is provided to a mold attached to an injection molding machine.

FIG. 2 schematically shows a state in which the gas-feeding nozzle 10 is provided to a mold attached to an injection molding machine. As shown in FIG. 2, the mold is constituted of a movable mold member 42 and a fixed mold member 46. The gas-feeding nozzle 10 is provided, for example, to the movable mold member 42. The gas-feeding nozzle 10 can be moved in forward and backward movements (in the directions of right hand side and left hand side in FIG. 2) with a moving means 50 attached to the movable mold member 42 and formed of a piston and a cylinder and so on. Numeral 52 indicates a gas tubing (a tubing for feeding a pressurized gas). One end of the gas tubing 52 is attached to the gas flow path 20 (shown in FIG. 1) of the gas-feeding nozzle 10, and the other end of the gas tubing communicates with a pressurized gas source (not shown).

Figure 3:
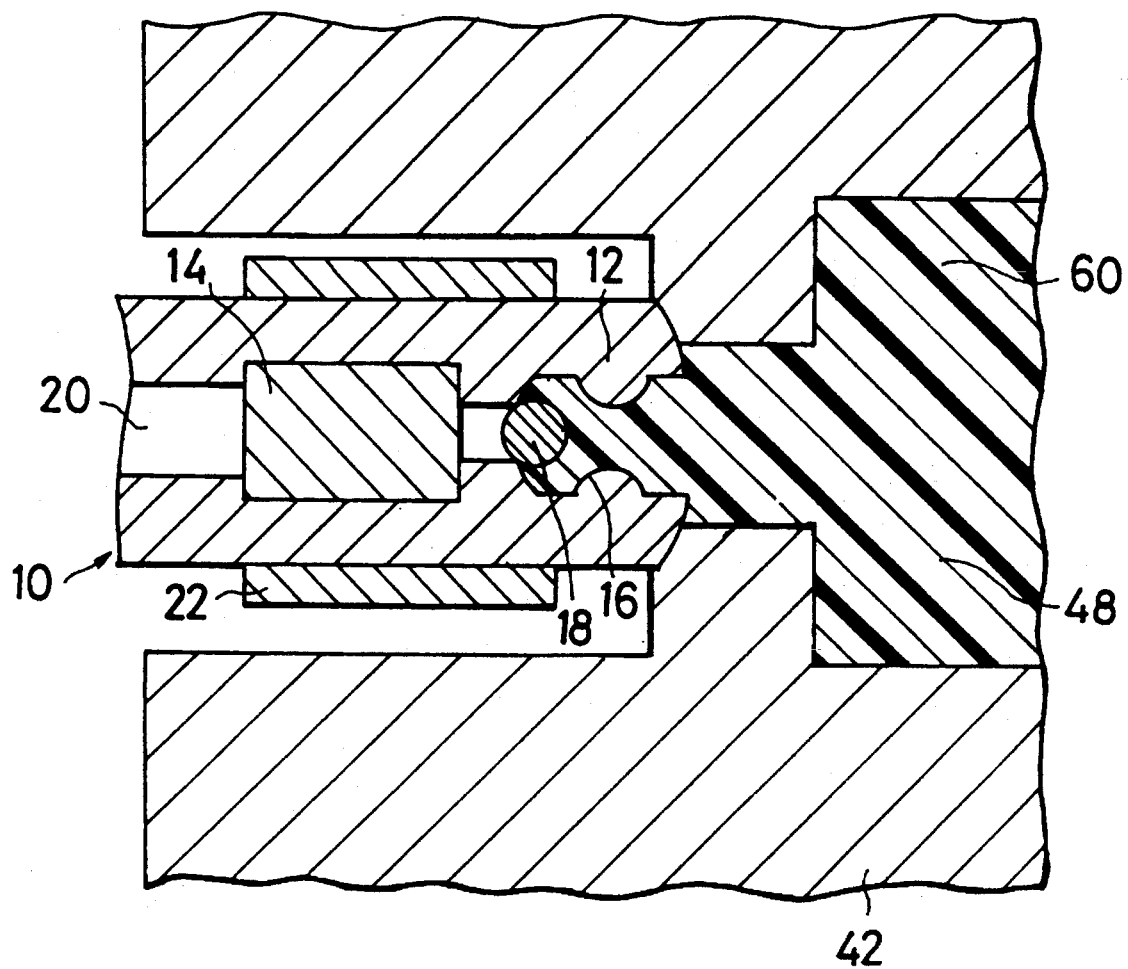
FIG. 3 is a schematic cross-sectional view showing states of the gas-feeding nozzle, a movable mold member and a molten resin in the cavity of the mold at a time when the molten resin has been injected into the cavity of the mold before the introduction of a pressurized gas into the molten resin.

FIG. 3 is an enlarged cross-sectional view of a portion indicated as A in FIG. 2.

A gas-feeding portion 44 (shown in FIG. 4) formed in the movable mold member 42 is open toward a cavity 48 of the mold. The gas-feeding nozzle 10 is moved toward the right hand side in FIG. 2 with the moving means 50, the outlet end of the gas-feeding nozzle 10 comes into intimate contact with the gas-feeding portion 44, whereby the flowing of a molten resin 60 (injected into the cavity 48 of the mold) out of the gas-feeding nozzle 10 can be prevented.

FIG. 3 schematically shows states of the gas-feeding nozzle 10, the movable mold member 42 and the molten resin 60 in the cavity 48 of the mold at a time when the molten resin 80 has been injected into the cavity 48 of the mold before the introduction of a pressurized gas into the molten resin 60. The gas-feeding nozzle 10 is put in a forward position with the moving means 50, and the outlet end portion of the gas-feeding nozzle 10 is in intimate contact with the gas-feeding portion 44 formed in the movable mold member 42.

Figure 4:
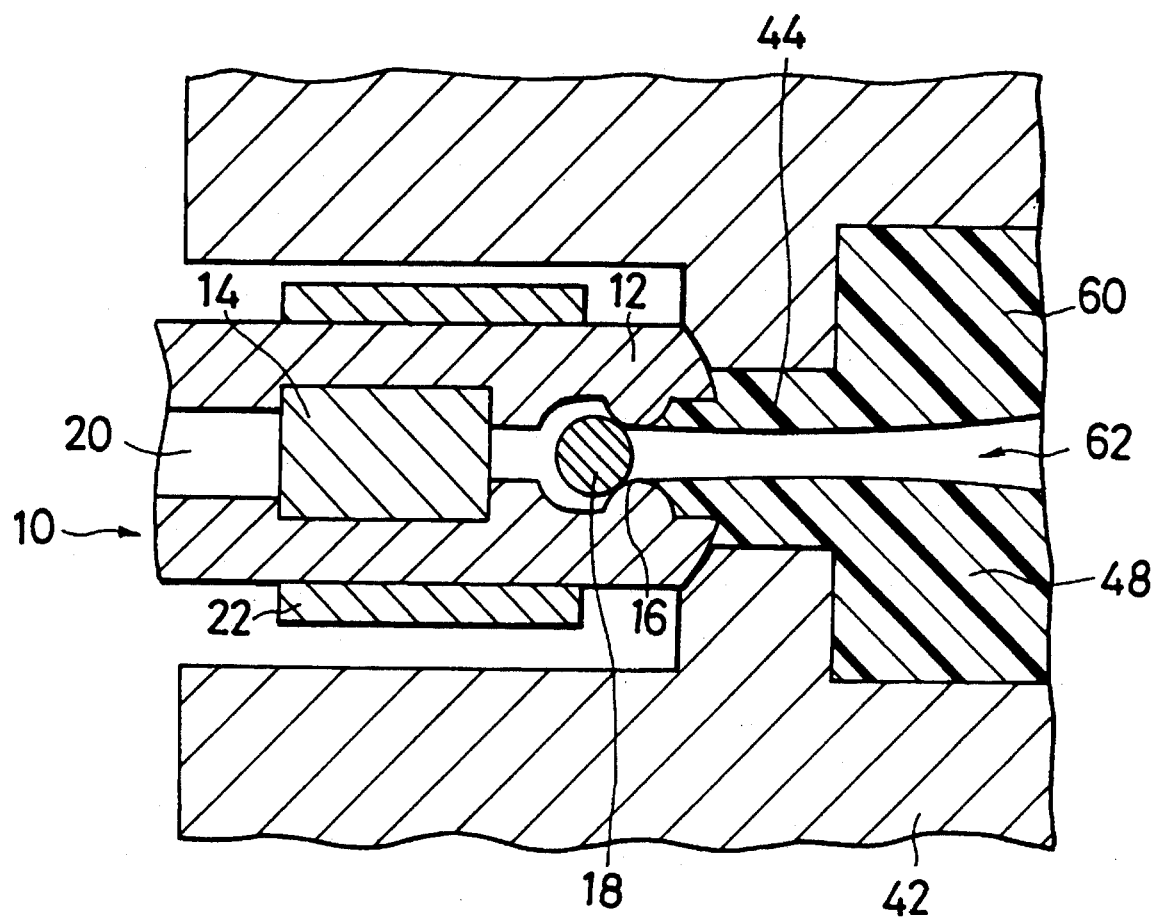
FIG. 4 is a schematic cross-sectional view showing states of the gas-feeding nozzle, a movable mold member and a molten resin in the cavity of the mold at a time when a pressurized gas is being introduced into the molten resin injected into the cavity of the mold.

FIG. 4 schematically shows states of the gas-feeding nozzle 10, the movable mold member 42 and the molten resin 60 in the cavity 48 of the mold at a step where a pressurized gas is being introduced into the molten resin 60 injected into the cavity 48 of the mold. Owing to the introduction of the pressurized gas into the molten resin 60, a hollow portion 62 is being formed within the molten resin 60.

Figure 5:
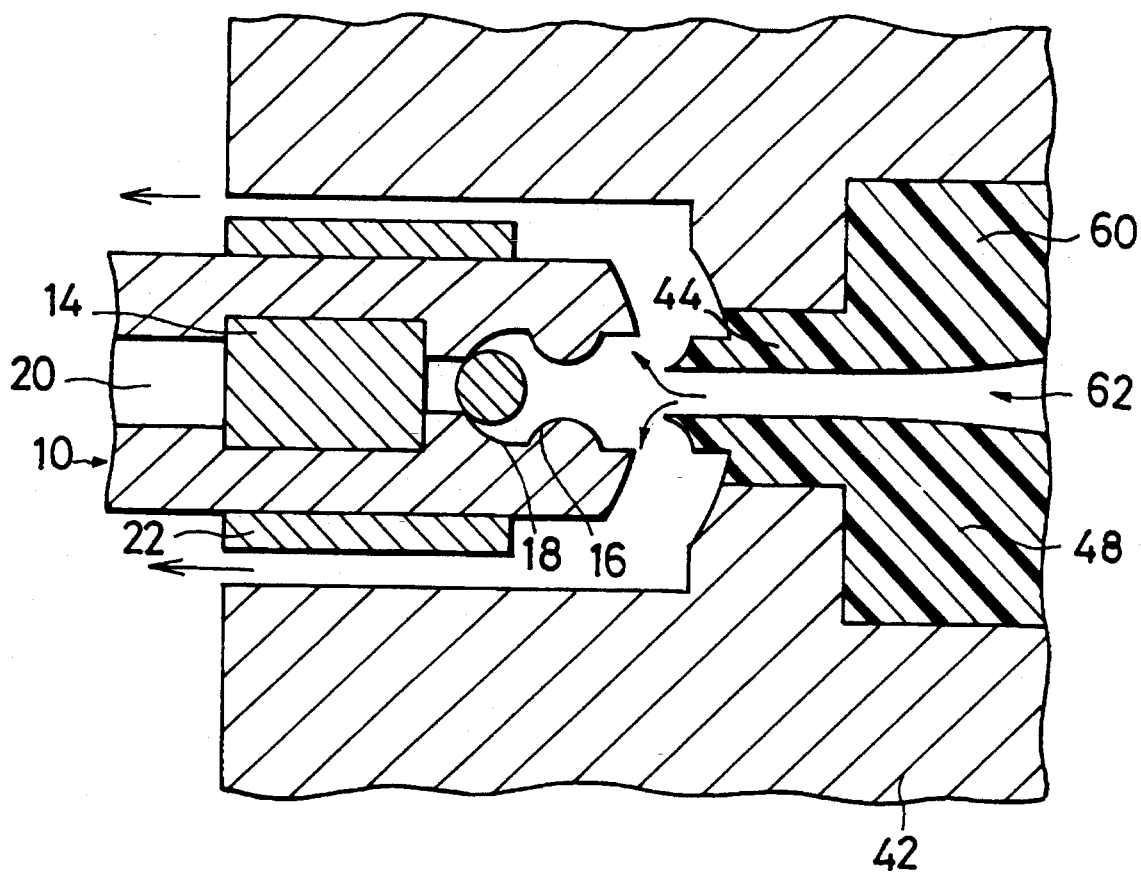
FIG. 5 is a schematic cross-sectional view showing states of the gas-feeding nozzle, a movable mold member and a cooled and solidified resin in the cavity of the mold at a time when a pressurized gas introduced into the molten resin is being released into atmosphere.

FIG. 5 schematically shows states of the gas-feeding nozzle 10, the movable mold member 42 and a cooled and solidified resin 60 in the cavity 48 of the mold at a time when the pressurized gas introduced into the molten resin is being released into atmosphere. The gas-feeding nozzle 10 is put in a backward position with the moving means 50, and the outlet end portion of the gas-feeding nozzle 10 is positioned apart from the gas-feeding portion 44 of the movable mold member 42, whereby the pressurized gas introduced into the molten resin is released into atmosphere.

EXAMPLE 1

Figure 6:
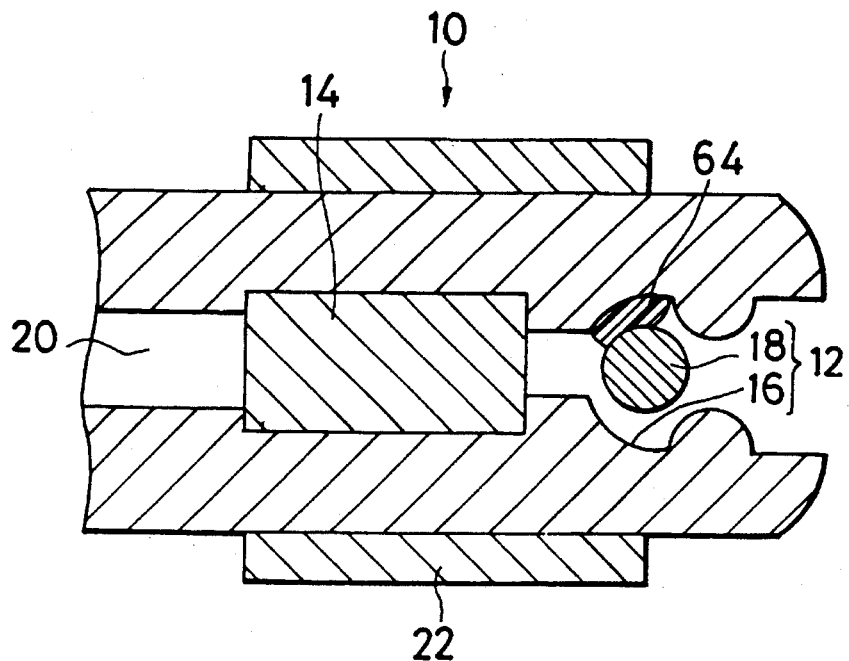
FIG. 6 is a schematic cross-sectional view showing a state in which fragments of a molten resin is allowed to adhere to part of a non-return valve and is cooled to solidness for an experiment.

The following experiment was carried out for testing the excellent function of the gas-feeding nozzle 10 shown in this Example. As shown in FIG. 6, a molten resin mass 64 of a fiber-reinforced polycarbonate (Iupilon GS-2030 white, supplied by Mitsubishi Gas Chemical Company, Inc.) was preliminarily allowed to adhere to part of the non-return valve 12 of the gas-feeding nozzle 10 and cooled to solidness so that the non-return valve 12 did not work properly.

The movable mold member 42 was moved to fasten the mold, and then the gas-feeding nozzle 10 was moved with the moving means 50 to bring the gas-feeding nozzle 10 into intimate contact with the gas-feeding portion 44 of the movable mold member 42. Thereafter, a modified polyphenylene ether resin (Iupiace AV 30 black, supplied by Mitsubishi Gas Chemical Company, Ltd.) was plasticated and melted in an injection cylinder 40 (FIG. 2) of an injection molding machine at a resin temperature of 240° C., and then the molten modified polyphenylene ether resin (molten resin 60) was injected into the cavity 48 at an injection pressure of 1,130 kg/cm$^2$-G. The injection operation was terminated 3.0 seconds after the injection was started, and at the same time, a compressed nitrogen gas having a pressure of 80 kg/cm$^2$-G as a pressurized gas was introduced into the molten resin 60 in the cavity 48 through the gas-feeding nozzle 10 to form a hollow structure in the molten resin 60. The resin was cooled for 60 seconds, and then the gas-feeding nozzle 10 was moved backward with the moving means 50 to release the pressurized gas in the hollow structure of the molded article into atmosphere. The mold was opened, and the molded article was taken out. The so-obtained molded article had the hollow structure in a thick wall portion, and the function of the gas-feeding nozzle 10 was sufficient.

The above experimental result showed that the pressurized gas was properly introduced into the molten resin 60 injected into the cavity 48. The gas-feeding nozzle 10 was inspected. As a result, a very small amount of a black resin remained on an internal wall of the gas flow path between the filter 14 and the non-return valve 12. This was because the resin mass 64 of a fiber-reinforced polycarbonate had been preliminarily allowed to adhere to part of the non-return valve 12. That is, the non-return valve 12 did not work properly when the molten resin was injected. However, it was found that molten resin had passed through the non-return valve 12 but that the flowing of the molten resin into the gas flow path 20 in the gas-feeding nozzle 10 was prevented by the filter 14 provided upstream to the non-return valve 12.

It is also considered that the pressurized gas passed through the filter 14 thereby to press the molten resin (which had flown up to the filter 14) back toward the cavity 48, and that the pressurized gas was then introduced into the molten resin 60 in the cavity 48. Further, the resin mass 84 which had been preliminarily allowed to adhere to part of the non-return valve 12 was removed.

Comparative Example 1

The experiment in Example 1 was repeated except that the filter 14 was removed from the gas-feeding nozzle 10. Incidentally, a molten resin mass 64 of a fiber-reinforced polycarbonate (Iupilon GS-2030 white, supplied by Mitsubishi Gas Chemical Company, Inc.) was preliminarily allowed to adhere to part of the non-return valve 12 of the gas-feeding nozzle 10 and cooled to solidness in the same way as in Example 1 so that the non-return valve 12 did not work properly.

No hollow structure was formed in the thick wall portion of a molded article, which showed that the pressurized gas was not introduced into the molten resin 60 in the cavity 48. The gas-feeding nozzle was inspected. As a result, the resin passed through the non-return valve 12, reached up to the gas flow path 20 and the gas tubing 52 and was cooled adhering to internal walls of these members. These results showed that the non-return valve 12 did not work properly and did not prevent the inflow of molten resin into the gas-feeding nozzle.

EXAMPLE 2

Figure 7:
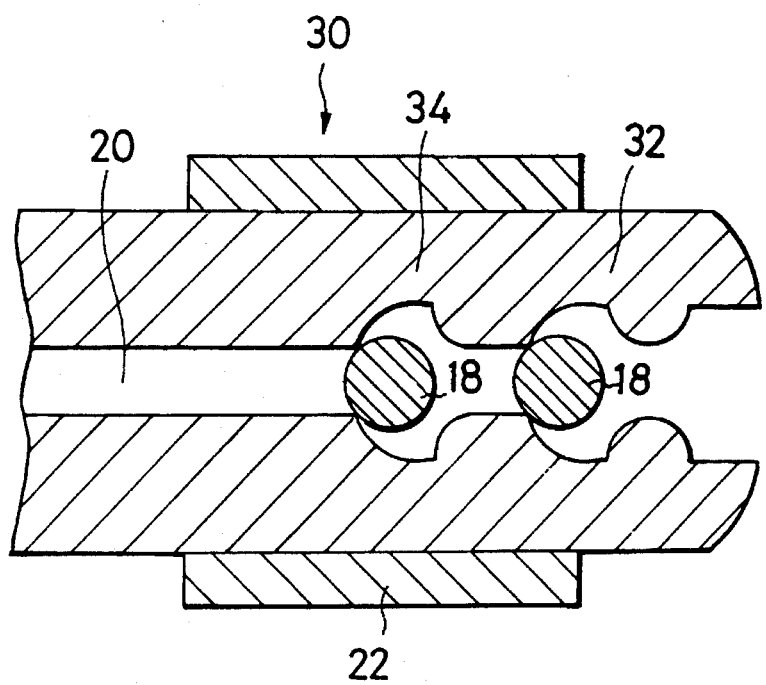
FIG. 7 is a schematic cross-section view of part of a gas-feeding nozzle used in Example 2.

FIG. 7 shows the schematic cross-sectional view of a gas-feeding nozzle 30 used in this Example. The gas-feeding nozzle 30 is constituted of a non-return valve 32 provided at an outlet end of the gas-feeding nozzle 30 and a means of preventing the inflow of molten resin, provided upstream to the non-return valve 32 in the flow direction of a pressurized gas. The means of preventing the inflow of molten resin, used in this Example, is constituted of one non-return valve 34 (to be referred to as "secondary non-return valve 34" hereinafter for distinguishing the same from the non-return valve 32). The gas-feeding nozzle 30 is provided to a mold (attached to an injection molding machine) in the same manner as shown in FIG. 2.

In FIG. 7, the same numerals as those used in FIG. 2 correspond to the same members or portions as those indicated by such numerals in FIG. 1. Further, the structure of each of the non-return valve 32 and the secondary non-return valve 34 may be substantially the same as that of the non-return valve 12 used in Example 1.

The following experiment was carried out for testing the excellent function of the gas-feeding nozzle 30 of Example 2. A molten resin mass of a fiber-reinforced polycarbonate (Iupilon GS-2030 white, supplied by Mitsubishi Gas Chemical Company, Inc.) was preliminarily allowed to adhere to part of the non-return valve 32 of the gas-feeding nozzle 30 and cooled to solidness as shown in FIG. 6 so that the non-return valve 32 did not work properly.

Then, the injection molding of a modified polyphenylene ether resin (Iupiace AV 30 black, supplied by Mitsubishi Gas Chemical Company, Ltd.) was carried out, a pressurized gas was introduced into the molten resin, the molten resin was cooled to solidness, the pressurized gas was released from the hollow structure into atmosphere, and a molded article was taken out of the mold, in the same manner as in Example 1 under the same conditions as those in Example 1. A hollow structure was formed in the thick wall portion of the molded article, which showed that the gas-feeding nozzle 30 worked properly.

The above experimental result showed that the pressurized gas was properly introduced into the molten resin injected into the cavity. The gas-feeding nozzle 30 was inspected. As a result, a very small amount of a black resin remained between the secondary non-return valve 34 and the non-return valve 32. This was because the resin mass 64 of a fiber-reinforced polycarbonate had been preliminarily allowed to adhere to part of the non-return valve 32. That is, the non-return valve 32 did not work properly when the molten resin was injected. However, it was found that the molten resin had passed through the non-return valve 32 but that the flowing of the molten resin into the gas flow path 20 in the gas-feeding nozzle 30 was prevented by the secondary non-return valve 34 provided upstream to the non-return valve 32.

It is also considered that the pressurized gas passed through the secondary non-return valve 34 thereby to press the molten resin (which had flown up to the secondary non-return valve 34) back toward the cavity, and that the pressurized gas was then introduced into the molten resin in the cavity. Further, the resin mass 64 which had been preliminarily allowed to adhere to part of the non-return valve 32 was removed.

Comparative Example 2

The experiment in Example 2 was repeated except that the ball 18 of the secondary non-return valve 34 as the means of preventing the inflow of molten resin was removed. Incidentally, a molten resin mass 64 of a fiber-reinforced polycarbonate (Iupilon GS-2030 white, supplied by Mitsubishi Gas Chemical Company, Inc.) was preliminarily allowed to adhere to part of the non-return valve 32 and cooled to solidness as shown in FIG. 6 so that the non-return valve 32 of the gas-feeding nozzle did not work properly.

No hollow structure was formed in the thick wall portion of a molded article, which showed that the pressurized gas was not introduced into the molten resin in the cavity. The gas-feeding nozzle was inspected. As a result, the resin passed through the non-return valve 32, reached up to the gas flow path 20 and the gas tubing 52 and was cooled, adhering to the internal walls of these members. These results showed that the non-return valve 32 did not work properly and did not prevent the inflow of molten resin into the gas-feeding nozzle.

As explained above, the gas-feeding nozzle of the present invention has the means of preventing the inflow of molten resin and therefore can accomplish the following. The clogging of the gas flow path caused by the flow of a molten resin into the gas-feeding nozzle can be reliably prevented, the pressurized gas can be smoothly and reliably introduced into a molten resin injected into the cavity of a mold, and molded articles having a desired hollow structure can be produced by a stable injection molding cycle.

What is claimed is:

1. A gas-feeding nozzle for use in a mold of an injection molding machine for introducing a pressurized gas into a molten resin injected into a cavity in the mold, to produce a molded article having a hollow structure, the gas-feeding nozzle comprising a non-return valve and a filter to prevent the inflow of molten resin, wherein the non-return valve is provided at an outlet end of the gas-feeding nozzle, and wherein the filter is provided upstream of the non-return valve relative to the flow direction of the pressurized gas and has a multiplicity of openings through which the pressurized gas is to be passed.

2. A gas-feeding nozzle according to claim 1, wherein the openings of the filter individually have a cross-sectional area of $8 \times 10^{-7}$ to $8 \times 10^{-3}$ mm$^2$.

3. A gas-feeding nozzle according to claim 2, wherein the openings of the filter individually have the form of a straight tube and a total cross-sectional area of the openings is at least 0.03 mm$^2$.

4. A gas-feeding nozzle according to claim 2, wherein the filter is formed of a sintered body of a stainless steel-based alloy or a sintered body of ceramics.

5. A gas-feeding nozzle according to claim 2, wherein the openings of the filter individually have the form of a curved tube and a total cross-sectional area of the openings is at least 0.03 mm$^2$.

\* \* \* \* \*